US008142938B2

(12) United States Patent
Khasin et al.

(10) Patent No.: US 8,142,938 B2
(45) Date of Patent: Mar. 27, 2012

(54) POROUS CLUSTERS OF SILVER POWDER PROMOTED BY ZIRCONIUM OXIDE FOR USE AS A CATALYST IN GAS DIFFUSION ELECTRODES, AND METHOD FOR THE PRODUCTION THEREOF

(75) Inventors: Ernst Khasin, Rehovot (IL); Arie Zaban, Shoham (IL)

(73) Assignee: Bar Ilan University, Ramat Gan (IL)

( * ) Notice: Subject to any disclaimer, the term of this patent is extended or adjusted under 35 U.S.C. 154(b) by 251 days.

(21) Appl. No.: 12/441,959

(22) PCT Filed: Sep. 24, 2007

(86) PCT No.: PCT/US2007/079261
§ 371 (c)(1),
(2), (4) Date: Dec. 11, 2009

(87) PCT Pub. No.: WO2008/036962
PCT Pub. Date: Mar. 27, 2008

(65) Prior Publication Data
US 2010/0143807 A1 Jun. 10, 2010

Related U.S. Application Data

(60) Provisional application No. 60/846,346, filed on Sep. 22, 2006.

(51) Int. Cl.
B01J 23/50 (2006.01)
B01J 31/00 (2006.01)
H01M 8/22 (2006.01)
H01M 4/60 (2006.01)

(52) U.S. Cl. ........ 429/405; 502/347; 502/159; 429/529; 429/212

(58) Field of Classification Search .................. None
See application file for complete search history.

(56) References Cited

U.S. PATENT DOCUMENTS

| 6,676,913 B2 | 1/2004 | Rossin |
| 2003/0064265 A1 | 4/2003 | Hampden-Smith et al. |
| 2004/0230083 A1 | 11/2004 | Weisbeck et al. |
| 2006/0175195 A1 | 8/2006 | Yamada et al. |

FOREIGN PATENT DOCUMENTS

| EP | 0371670 A1 | 6/1990 |
| JP | 2006-212464 | * 8/2006 |

OTHER PUBLICATIONS

Bogdanchikova et al. (New Frontiers in Catalysis, Proceedings of the 10th International Congress on Catalysis, Jul. 19-24, 1992, Budapest, Hungary, Guczi, L. et al. (Editors)).*
International Search Report for International Application No. PCT/US2007/079261. Date of Mailing of the International Search Report is Mar. 25, 2008.
Kundakovic, LJ., Flytzani-Stephanoloulous; M.; 'Deep oxidation of methane over zirconia supported Ag catalysts', Applied Catalysts, vol. 183, pp. 35-51, 1999.
European Search Report for 07843033.7, dated Dec. 9, 2011.

* cited by examiner

*Primary Examiner* — Melvin Mayes
*Assistant Examiner* — Yun Qian
(74) *Attorney, Agent, or Firm* — Pearl Cohen Zedek Latzer, LLP; Zeev Pearl

(57) ABSTRACT

A catalyst including: a plurality of porous clusters of silver particles, each cluster including: (a) a plurality of primary particles of silver, and (b) crystalline particles of zirconium oxide ($ZrO_2$), wherein at least a portion of the crystalline particles of $ZrO_2$ is located in pores formed by a surface of the plurality of primary particles of silver.

9 Claims, 6 Drawing Sheets

POROUS CLUSTERS OF SILVER POWDER PROMOTED BY ZIRCONIUM OXIDE FOR USE AS A CATALYST IN GAS DIFFUSION ELECTRODES, AND METHOD FOR THE PRODUCTION THEREOF

CROSS-REFERENCE TO RELATED APPLICATIONS

This application is a National Phase Application of PCT International Application No. PCT/US2007/079261, International Filing Date Sep. 24, 2007, claiming priority of US Provisional Patent Application, 60/846,346, filed Sep. 22, 2006 which is incorporated herein by reference in its entirety.

FIELD AND BACKGROUND OF THE INVENTION

The present invention relates to silver-based catalysts containing porous clusters of silver powder promoted by zirconium oxide and to a method of making the silver-based catalysts, to catalyst mixes including such silver-based catalysts and a water repellant polymer and to a method of making the catalyst mixes, and more particularly, to a gas diffusion electrode containing such catalysts and mixes, and to a method for making such electrodes.

The present invention also relates to the application of the inventive silver-based catalysts in various alkaline electrolyte electrochemical cells, such as alkaline fuel cells, metal hydride anode alkaline fuel cells, metal-air rechargeable batteries, metal-air non-rechargeable batteries, oxygen sensors, and electrolysis cells, such as but not limited to chlor-alkali cells.

The present invention also relates to the application of the inventive catalyst mixes and the inventive gas diffusion electrodes in such alkaline electrolyte electrochemical cells.

There are many uses for silver catalysts, including the chemical industry (e.g., in reaction of ethylene oxidation), batteries (both primary and rechargeable) and fuel cells with alkaline electrolyte, oxygen sensors, and electrolysis cells. Sub-micron and nano-size silver metal powder and silver based bulk alloy catalysts can be produced by different methods, including the Raney method of making a "skeleton" catalyst from Ag—Ca, Ag—Mg, Ag—Al and others alloys, chemical precipitation, leaching of Al from heat treated strips of Al—Ag alloys (see, by way of example, U.S. Pat. No. 5,476,535, which is incorporated by reference for all purposes as if fully set forth herein), and others.

The above methods result in a porous silver agglomerate or cluster of particles in a range of sizes from tenths of microns to a few millimeters, consisting of primary particles having an average size from about sub-micron to a few hundred microns.

While all the above-described methods can produce silver powder catalysts having sub-micron or nano-size primary particles, these techniques have been found to have a drawback if the final product is used as a catalyst for air or oxygen electrodes for batteries and fuel cells with alkaline electrolyte. This drawback relates to the phenomenon of silver catalyst dissolution in alkaline electrolyte.

Silver, by itself, has a very low rate of dissolution in alkaline solutions. On the other hand, silver oxides have a much higher dissolution rate. At an anodic oxidation of silver in alkaline solution, the first phase transition at a potential of +0.24V (here and throughout this application the potentials are vs. a Hg/HgO reference electrode) is Ag→$Ag_2O$. The next phase transition is $Ag_2O$→AgO at a potential of about +0.5V.

These values of potentials were determined in various classic studies for smooth silver foil (see M. Pourbaix, Atlas of Electrochemical Equilibria in Aqueous Solutions, (1966), p. 393). For fine silver powder and for any kind of nano-sized silver catalyst in particular, the formation of silver oxides starts at much more cathodic potentials. Y. Golin, et al. (Electrochimia, Vol. 18, p. 1223) disclose that $Ag_2O$ appears on the surface of ultra-fine silver catalyst at a potential of about +0.1V. This range of potentials corresponds to the open circuit voltage (OCV) of oxygen/air electrodes in alkaline electrolyte. If a silver-catalyzed cathode works as a bi-functional electrode, the potentials in the charge mode of operation could reach +0.4-0.5V and even higher, until the process of oxygen evolution occurs. This means that substantially all the problems of silver catalyst dissolution result from the formation of different types of silver oxides at OCV and anodic polarization, and their subsequent decomposition and precipitation.

While there has been some discussion in the technical literature as to the nature of the dissolution of silver oxide, it is generally agreed that the silver is present in alkaline electrolyte in the form of anions, like $Ag(OH)_2^-$ or $AgO^-$ (H. Fleischer, (ed.), Zinc-Silver Oxide Batteries, J. Wiley (1971)), and has a tendency, during decomposition, to slowly form a finely divided black deposit of metallic silver. The rate of decomposition increases with increasing concentration of dissolved silver oxide, temperature and the presence of various kinds of impurities.

The precipitated silver black has tremendous diffusion ability, which results in roughening of the primary ultra fine porous structure, decreased surface area of the catalyst, and correspondingly, reduced electrode performance.

While the dissolution of silver may be inhibited or diminished by deliberate, continuously maintained polarization of the electrochemical power sources having silver-catalyzed or bulk-silver-alloy-catalyzed air or oxygen cathodes, this is highly disadvantageous, and in many cases, practically unimplementable.

There is therefore a recognized need for, and it would be highly advantageous to have, a silver material, modified chemically, that inherently is stable and resistant to dissolution.

SUMMARY OF THE INVENTION

According to the teachings of the present invention there is provided a catalyst including: a plurality of porous clusters of silver particles, each cluster of the clusters including: (a) a plurality of primary particles of silver, and (b) crystalline particles of zirconium oxide ($ZrO_2$), wherein at least a portion of the crystalline particles of $ZrO_2$ is located in pores formed by a surface of the plurality of primary particles.

According to further features in the described preferred embodiments, the crystalline particles of $ZrO_2$ have an average particle size of less than about 50 nanometers.

According to still further features in the described preferred embodiments, the crystalline particles of $ZrO_2$ have an average particle size of less than about 20 nanometers.

According to still further features in the described preferred embodiments, the crystalline particles of $ZrO_2$ have an average particle size of less than about 10 nanometers.

According to still further features in the described preferred embodiments, the crystalline particles of $ZrO_2$ have an average particle size of less than about 6 nanometers.

According to still further features in the described preferred embodiments, the crystalline particles of $ZrO_2$ have an average particle size of about 2 to 5 nanometers.

According to still further features in the described preferred embodiments, the clusters of silver particles have an average size in the range of 1 to 50 microns.

According to still further features in the described preferred embodiments, the clusters of silver particles have an average size in the range of 3 to 25 microns.

According to still further features in the described preferred embodiments, the primary particles of silver have an average particle size of up to 100 nanometers.

According to still further features in the described preferred embodiments, the primary particles of silver have an average particle size of up to 60 nanometers.

According to still further features in the described preferred embodiments, the primary particles of silver have an average particle size of 20 to 100 nanometers.

According to still further features in the described preferred embodiments, the primary particles of silver have an average particle size of 40 to 60 nanometers.

According to still further features in the described preferred embodiments, the pores in the porous clusters have an average characteristic diameter of 15 to 250 nanometers.

According to still further features in the described preferred embodiments, the pores in the porous clusters have an average characteristic diameter of 50 to 80 nanometers.

According to still further features in the described preferred embodiments, the B.E.T. specific surface area of the catalyst is in a range of 3 to 16 square meters per gram.

According to still further features in the described preferred embodiments, the B.E.T. specific surface area of the catalyst is in a range of 6 to 10 square meters per gram.

According to still further features in the described preferred embodiments, the concentration of the crystalline particles of zirconium oxide in the catalyst is between 1% and 6%, by weight.

According to still further features in the described preferred embodiments, the concentration of the crystalline particles of zirconium oxide in the catalyst is in a range of 2% to 4%, by weight.

According to still further features in the described preferred embodiments, the average agglomerate B.E.T. porosity of the catalyst is in the range of 30% to 50%.

According to still further features in the described preferred embodiments, the average agglomerate B.E.T. porosity is in the range of 35% to 45%.

According to still further features in the described preferred embodiments, the tap density of the catalyst as described herein is in the range of 1 to 3 g/cc.

According to still further features in the described preferred embodiments, the tap density of the catalyst as described herein is in the range of 1.5 to 2.5 g/cc.

According to still further features in the described preferred embodiments, the concentration of the silver and the crystalline particles of zirconium oxide in the catalyst exceeds 99% by weight.

According to still further features in the described preferred embodiments, the concentration of the silver and the crystalline particles of zirconium oxide in the catalyst exceeds 99.6% by weight.

According to still further features in the described preferred embodiments, the concentration of the silver and the crystalline particles of zirconium oxide in the catalyst is in a range of in the range of 99.6% to 99.95%, by weight.

According to another aspect of the present invention there is provided an active catalyst mix, the mix including the catalyst substantially as described herein, and a water-repellant polymer.

According to further features in the described preferred embodiments, the water-repellant polymer is present in a concentration in a range of 5% to 20%, by weight.

According to still further features in the described preferred embodiments, the water-repellant polymer is present in a concentration in a range of 12% to 18%, by weight.

According to still further features in the described preferred embodiments, the water-repellant polymer is selected from the group of water-repellant polymers consisting of paraffins and hydrophobic polymers.

According to still further features in the described preferred embodiments, the hydrophobic polymers include fluorinated polymers.

According to still further features in the described preferred embodiments, the fluorinated polymers include polytetrafluoroethylene, fluorinated ethylene-propylene, a perfluoroalkoxy polymer resin chlorotrifluoroethylene, and a polyvinylidene fluoride.

According to another aspect of the present invention there is provided an air electrode including: (a) an active mix of silver catalyst, including: a catalyst having a plurality of porous clusters of silver particles, each cluster of the clusters including: (i) a plurality of primary particles of silver, and (ii) crystalline particles of zirconium oxide ($ZrO_2$), wherein at least a portion of the crystalline particles of $ZrO_2$ is located in pores formed by a surface of the plurality of primary particles; (b) an electrically conductive current collector having a specific electrical resistivity below $1 \times 10^{-5}$ ohm meters, and (c) a porous hydrophobic film, wherein the active mix and the current collector are located together on a single broad face of the porous hydrophobic film, the active mix and the current collector being bonded to the hydrophobic film.

According to further features in the described preferred embodiments, the current collector is selected from the group consisting of metal screen, metal wire mesh, non-woven metal fiber mat, perforated metal sheet, and expanded metal foil.

According to still further features in the described preferred embodiments, the current collector includes a material selected from the group consisting of nickel, nickel alloys, steel, stainless steels, silver, silver-coated nickel, silver-coated nickel alloys, silver-coated steel, silver-coated stainless steel.

According to still further features in the described preferred embodiments, the current collector is coated with silver.

According to still further features in the described preferred embodiments, the porous hydrophobic film is selected from the group of porous hydrophobic films consisting of polytetrafluoroethylene, fluorinated ethylene-propylene, perfluoroalkoxy polymer resin, chlorotrifluoroethylenes, and polyvinylidene fluorides.

According to still further features in the described preferred embodiments, the air electrode consists essentially of: (a) the active mix of silver catalyst; (b) the current collector, and (c) the porous hydrophobic film.

According to yet another aspect of the present invention there is provided an air electrode including: (a) a catalyst having a plurality of porous clusters of silver particles, each cluster of the clusters including: (i) a plurality of primary particles of silver, and (ii) crystalline particles of zirconium oxide ($ZrO_2$), wherein at least a portion of the crystalline particles of $ZrO_2$ is located in pores formed by a surface of the plurality of primary particles; (b) a current collector, and (c) a porous hydrophobic film, wherein the catalyst and the current collector are located together on a single broad face of the porous hydrophobic film, the active mix and the current collector being bonded to the hydrophobic film.

According to yet another aspect of the present invention there is provided an air electrode including: (a) an active mix of silver catalyst, including: a catalyst having a plurality of porous clusters of silver particles, each cluster of the clusters including: (i) a plurality of primary particles of silver, and (ii) crystalline particles of zirconium oxide ($ZrO_2$), wherein at least a portion of the crystalline particles of $ZrO_2$ is located in pores formed by a surface of the plurality of primary particles, and (b) a porous hydrophobic film, wherein the active mix of silver catalyst is located on a single broad face of the porous hydrophobic film, the active mix being bonded to the hydrophobic film.

According to yet another aspect of the present invention there is provided an air electrode including: (a) a catalyst having a plurality of porous clusters of silver particles, each cluster of the clusters including: (i) a plurality of primary particles of silver, and (ii) crystalline particles of zirconium oxide ($ZrO_2$), wherein at least a portion of the crystalline particles of $ZrO_2$ is located in pores formed by a surface of the plurality of primary particles, and (b) a porous hydrophobic film, wherein the catalyst is disposed on, and bonded to, a single broad face of the porous hydrophobic film.

According to still further features in the described preferred embodiments, the current collector is electrically conductive and is selected from the group consisting of metal screen, metal wire mesh, non-woven metal fiber mat, perforated metal sheet, and stretched (expanded) metal foil.

According to still further features in the described preferred embodiments, the current collector includes a metal selected from the group consisting of nickel, nickel alloys, steel, stainless steels, silver, silver-coated nickel, silver-coated nickel alloys, silver-coated steel, and silver-coated stainless steel.

According to still further features in the described preferred embodiments, the current collector is coated with silver.

According to still further features in the described preferred embodiments, the porous hydrophobic film is chosen from but not limited to polytetrafluoroethylene, fluorinated ethylene-propylene, perfluoroalkoxy polymer resin chlorotrifluoroethylenes, and polyvinylidene fluorides.

According to still further features in the described preferred embodiments, the electrode includes a carbon powder.

According to still further features in the described preferred embodiments, the electrode includes a mixture including the active mix and carbon powder.

According to still further features in the described preferred embodiments, the air electrode that includes a mixture including the catalyst as described herein and carbon.

According to still further features in the described preferred embodiments, the porous hydrophobic film includes a polymer powder having an average size of less than 5 microns.

According to still further features in the described preferred embodiments, the porous hydrophobic film includes a polytetrafluoroethylene powder having an average size of less than about 5 microns.

According to still further features in the described preferred embodiments, the polytetrafluoroethylene powder has an average size of less than about 3 microns.

According to still further features in the described preferred embodiments, the loading of the active catalyst mix is in a range of 5 to 100 $mg/cm^2$.

According to still further features in the described preferred embodiments, the loading is less than 80 $mg/cm^2$.

According to still further features in the described preferred embodiments, the loading is less than 60 $mg/cm^2$.

According to still further features in the described preferred embodiments, the loading is less than 40 $mg/cm^2$.

According to still further features in the described preferred embodiments, the electrode is produced by a method that includes compacting and sintering.

According to still further features in the described preferred embodiments, the thickness of the hydrophobic layer is in a range of 25 to 300 microns.

According to yet another aspect of the present invention there is provided an electrochemical cell including: (a) an anode; (b) an air electrode as described hereinabove, the air electrode being adapted to function as a cathode, and (c) an electrolyte.

According to still further features in the described preferred embodiments, the electrolyte is an alkaline electrolyte, and the cell is an alkaline electrolyte electrochemical cell.

According to still further features in the described preferred embodiments, the electrochemical cell is selected from the group consisting of alkaline fuel cells, metal hydride anode alkaline fuel cells, metal-air rechargeable batteries, metal-air non-rechargeable batteries, oxygen sensors, and electrolysis cells.

According to still further features in the described preferred embodiments, the electrolysis cells include chlor-alkali cells.

According to still further features in the described preferred embodiments, the alkaline fuel cell is adapted to consume an anode fuel selected from the group of anode fuels consisting of hydrogen, ethanol, methanol, aqueous solutions of ethanol, and aqueous solutions of methanol.

According to still further features in the described preferred embodiments, the alkaline fuel cells are adapted to use as the fuel for the cathode a fuel selected from the group consisting of air, air filtered to remove carbon dioxide, and oxygen.

According to still further features in the described preferred embodiments, the electrochemical cell is a metal-air rechargeable battery, and the anode is selected from the group consisting of zinc, magnesium, lithium, aluminum, alloys of these metals, and mixtures thereof.

According to still further features in the described preferred embodiments, the electrochemical cell is a metal-air non-rechargeable battery, and the anode is selected from the group consisting of zinc, magnesium, lithium, aluminum, alloys of these metals, and mixtures thereof.

According to still further features in the described preferred embodiments, the cell is an air or oxygen depolarized chlor-alkali cell.

According to still further features in the described preferred embodiments, the alkaline electrolyte electrochemical cell includes (a) an anode; (b) a cathode, and (c) an alkaline electrolyte, wherein the cathode includes the catalyst as described hereinabove.

According to still further features in the described preferred embodiments, the alkaline electrolyte electrochemical cell includes: (a) an anode; (b) a cathode, and (c) an alkaline electrolyte, wherein the cathode includes the active catalyst mix as described hereinabove.

According to yet another aspect of the present invention there is provided a method of producing a nano-size silver catalyst promoted by zirconium oxide, the method including: (a) providing a silver powder containing a porous agglomeration of silver particles, the particles having an average primary particle size of up to 150 nanometers; (b) impregnating the agglomeration of silver particles by contacting the particles with an aqueous solution containing a zirconium (IV) compound selected from the group consisting of zirconium (IV) dinitrate oxide hydrate and zirconium (IV) dichloride oxide hydrate, so as to form a suspension; (c) contacting the suspension with an aqueous alkaline solution to produce zirconium hydroxide, which precipitates in pores of the porous agglomeration; (d) rinsing and drying the agglomerates with the zirconium hydroxide precipitated in the pores to produce a dried residual material, and (e) heating the dried residual material, preferably at 250-300° C. for 30 to 60 minutes to effect dehydration, and subsequently, heating at 400-550° C. for 10 to 30 minutes to produce crystals of zirconium oxide, thereby forming the nano-size silver catalyst promoted by zirconium oxide.

According to still further features in the described preferred embodiments, the average primary particle size of the silver particles is up to 100 nanometers.

According to still further features in the described preferred embodiments, the rinsing is performed so as to bring the solution to a pH in a range of 6 to 8.

According to still further features in the described preferred embodiments, the alkaline solution includes a metal hydroxide selected from the group consisting of potassium hydroxide and sodium hydroxide.

According to still further features in the described preferred embodiments, the air electrode, for use in alkaline electrochemical cells, includes: (a) the active mix of silver catalyst substantially as described herein, wherein the silver catalyst is present at about 84% by weight, and polytetrafluoroethylene is present at about 16%, the size of the porous cluster of silver particles promoted by zirconium oxide (IV) is in the range of 3 to 25 microns. The crystallized particles of ZrO2 (IV) are located in the pores of the silver agglomerate on the surface of the primary particles and their size is less than 20 nanometers and most preferably is about 3-5 nanometers; the average agglomerate porosity is in the range of 35% to 45%; the average pore size distribution is preferably between 50 nanometers and 80 nanometers; the B.E.T. specific surface area of the porous cluster is preferably between 6 and 10 square meters per gram; the tap density in units of grams per cubic centimeter is in the range of preferably between 1.5 and 2.5 g/cc; the purity of the silver in the catalyst is preferably in the range of 99.6% to 99.95%; the zirconium oxide content in the catalyst porous cluster is preferably between 2% to 4%; and the minimum purity of the promoted catalyst, i.e., silver and zirconium oxide together, is at least 99.7% by weight; (b) a metal current collector in mesh, screen, or expanded perforated foil format wherein such metal is either nickel, stainless steel, or such metals coated with silver, and (c) a porous polytetrafluoroethylene film.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings.

DESCRIPTION OF THE PREFERRED EMBODIMENTS

Figure 1:
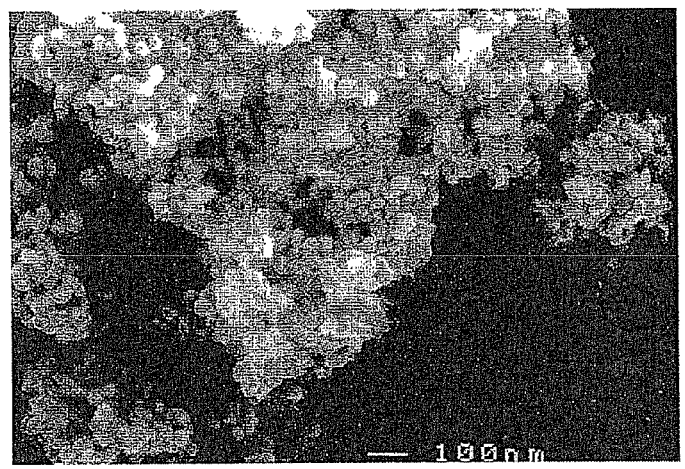
FIG. 1 is a High Resolution Scanning Electron Microscope (HRSEM) image of porous cluster of silver particles.

One aspect of the present invention relates to silver-based catalysts containing porous clusters of silver powder promoted by zirconium oxide and to a method of making the silver-based catalysts.

The principles and operation of the inventive catalysts, catalyst mixes, electrodes, and methods of production thereof may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

As used herein in the specification and in the claims section that follows, the terms "air cathode" and "oxygen cathode" are used interchangeably to refer to a gas diffusion electrode used as the site of the reaction of oxygen in an electrochemical cell.

Figure 2:
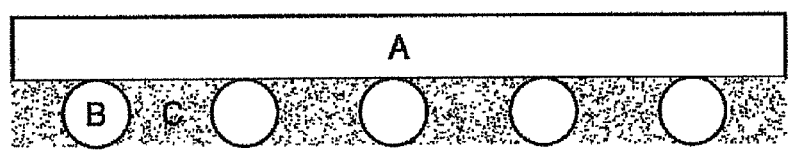
FIG. 2 is a schematic drawing of one embodiment of the inventive air cathode structure.

Referring now to the drawings, FIG. 1 is a High Resolution Scanning Electron Microscope (HRSEM) image of porous cluster of silver particles, and FIG. 2 is a schematic drawing of one embodiment of the inventive air cathode structure, wherein an inventive active catalyst mix C is distributed around and in direct contact with at least one current collector B. Active catalyst mix C and current collector B are together located on one broad face of a hydrophobic layer A.

In one embodiment of this invention such electrodes can be made with a carbon powder support for the inventive catalyst or for the inventive catalyst mix.

In a preferred embodiment of this invention the alkaline electrolyte air/oxygen cathode can be made without a carbon powder support for the inventive catalyst or for the inventive catalyst mix.

In fact, the composition and structure of the inventive catalyst permits the production of carbon-less air cathodes. These inventive electrodes in their various embodiments can be used in various applications, including but not limited to alkaline electrolyte electrochemical cells such as but not limited to alkaline fuel cells, metal hydride anode alkaline fuel cells, metal-air rechargeable batteries, metal-air non-rechargeable batteries, oxygen sensors, and electrolysis cells, such as but not limited to chlor-alkali cells.

Such electrodes made with the inventive silver catalyst and silver catalyst mix have advantages over state of the art silver-catalyzed electrodes including longer life time, more robust structure and much higher stability porous structure and maintenance of the surface area at the open circuit voltage (OCV) and also much improved capability to operate in the bi-functional mode in alkaline electrolytes. By bi-functional mode, we mean the ability to perform in both oxidative and reductive modes. In battery terminology, bi-functional mode capability manifests itself in both the charging and discharging of the battery.

In the inventive cathode applications referenced herein, the alkaline fuel cells are of a type that includes those that use anode fuels from a group that includes but is not limited to hydrogen, ethanol, methanol, aqueous solutions of ethanol, and aqueous solutions of methanol. The source of hydrogen may be directly from hydrogen gas or hydrogen reformed from methanol, or other sources such as but not limited to ethanol.

These alkaline fuel cells can be either of a type that use filters to filter out carbon dioxide from the air used for the cathode fuel or of a type that do not use filters to filter out carbon dioxide from the air used for the cathode fuel. In other words, the inventive air cathode can work directly in air containing carbon dioxide.

The metal anodes for use, in conjunction with the inventive cathode, in rechargeable-metal air batteries and in non-rechargeable-metal air batteries, may contain zinc, magnesium, lithium, aluminum, alloys of these metals, and mixtures thereof.

Electrodes made with the inventive silver catalyst have advantages over state of the art silver-catalyzed electrodes including a longer life time, a more robust structure and a much higher stability porous structure permitting maintenance of the surface area under both open circuit voltage and closed circuit conditions, and also much improved capability to operate in the bi-functional mode in alkaline electrolytes.

The alkaline electrolyte chosen for the electrochemical cell applications of this invention includes a metal hydroxide that is chosen from the group that includes but is not limited to potassium hydroxide, sodium hydroxide, magnesium hydroxide, aluminum hydroxide, lithium hydroxide, nickel hydroxide, and mixtures thereof. The concentration of the electrolyte can range from sub-molar to saturation.

In one embodiment of this invention the electrolysis cell is a chlor-alkali cell that uses oxygen depolarized cathodes.

Clean, sustainable energy is a global concern. Air cathodes are at the very heart of some of today's most advanced power sources, namely high energy metal-air batteries and alkaline fuel cells. These power sources are used for back-up power, portable and emergency uses, electric vehicles, biomedical devices like hearing aids and cochlear implants, portable telecommunication devices for military and civilian use, portable electronic devices, pilot-less drones, and in the space program, to name just a few of their applications. Alkaline fuel cells are one of the most developed types of fuel cells. They have been used since the mid-1960s by NASA in the Apollo and Space Shuttle programs and in Russian missions. The function of air cathodes in these power sources is to convert oxygen into electricity as the cathodic portion of the electrochemical coupled reaction. But in spite of their critical role they remain one of the most costly components, about a quarter of the cell cost in some cases due to use of platinum or other precious metal catalysts, and also a major limiting factor in cell performance. Thus there is an important need to improve the quality of air cathodes and lower their cost.

The air cathode of the present invention may allow electrochemical cells, such as batteries and fuel cells, to last longer and significantly cuts their costs. Commercial air cathodes are made with carbon powder that acts as a support for the catalyst. But since the carbon can deteriorate during normal use the life of the cell is usually shortened. The inventive silver catalyst allows the production of carbon-less air cathodes thereby making the cathode much more robust for extended life, easier manufacturing, and better durability. The inventive catalyst also provides much higher power than non-precious metal catalysts like those based on manganese, cobalt, nickel, or combinations thereof, but at much lower cost than platinum. The inventive carbon-less silver based catalyst electrode can be used as a direct 'drop-in' replacement for conventional air cathodes in alkaline fuel cells and metal-air batteries to reduce cost and improve performance. One of the factors limiting the commercialization of rechargeable metal-air batteries is the presence of carbon in the cathode, which tends to oxidize and degrade during charging. Thus, the inventive carbon-less cathode also enables development of rechargeable metal-air cells that are not otherwise viable.

According to the present invention, there is provided a method of producing porous clusters of silver particles promoted by $ZrO_2$—zirconium oxide (IV), the method including:

1. providing a silver powder having a porous agglomerate structure and a primary particle size in the range of up to 100-150 nanometers, and more preferably, up to 100 nanometers;
2. impregnation of the silver agglomerate by a water solution that includes zirconium (IV) dinitrate oxide hydrate —$ZrO(NO3)2.xH2O$ or zirconium (IV) dichloride oxide hydrate —$ZrOCl2.XH2O$; this treatment lasts for at least 30 minutes;
3. treatment of this suspension by an alkaline aqueous solution, preferably under intensive stirring, to precipitate zirconium hydroxide in the pores of the agglomerate;
4. rinsing the suspension to about neutral pH of between 6-8 in order to remove the alkaline aqueous solution from the pores and then drying to produce a residual material;
5. heat treatment of the dried suspension, preferably at 250-300° C. for 30-60 minutes to dehydrate the zirconium hydroxide and then subsequently at 400-550° C. for an additional 10-30 minutes to produce zirconium oxide crystals;
6. separating off coarse material having a particle size of above 40 to above 250 microns, typically by sieving.

The alkaline water solution is preferably either sodium hydroxide or potassium hydroxide, or mixtures thereof, at a concentration by weight of between 5 to 40%, by weight.

Mechanism of Action and Product Structure

The impregnation of the silver porous agglomerate by a water solution containing zirconium (IV) dinitrate oxide hydrate or zirconium (IV) dichloride oxide hydrate —$ZrOCl_2.XH_2O$, followed by alkaline water solution treatment, preferably under intensive stirring, results in precipitation of zirconium hydroxide into the pores of the agglomerate. After washing the suspension, drying, and heating, preferably at 250-300° C., ultra-fine dehydrated crystallized particles of $ZrO_2$ deposit into the pores of silver agglomerates on the surface of primary particles. At 400-550° C., final formation of monoclinic crystals of $ZrO_2$ occurs. These crystals have full corrosion stability in strong alkaline solution within all the range of the air electrode's working potentials, including the bi-functional mode of operation. The size of the zirconium oxide crystals of the present invention is less than 50 nanometers, preferably less than 20 nanometers and most preferably is about 3-5 nanometers. The zirconium oxide crystals prevent intensive surface diffusion and roughening of the silver agglomerate's porous structure, which the bulk alloys of silver cannot do.

The catalyst of this invention includes a porous cluster of primary silver particles promoted by zirconium oxide. Crystalline particles of $ZrO_2$ are located in the pores of the silver agglomerate on the surface of the primary particles.

Figure 3A:
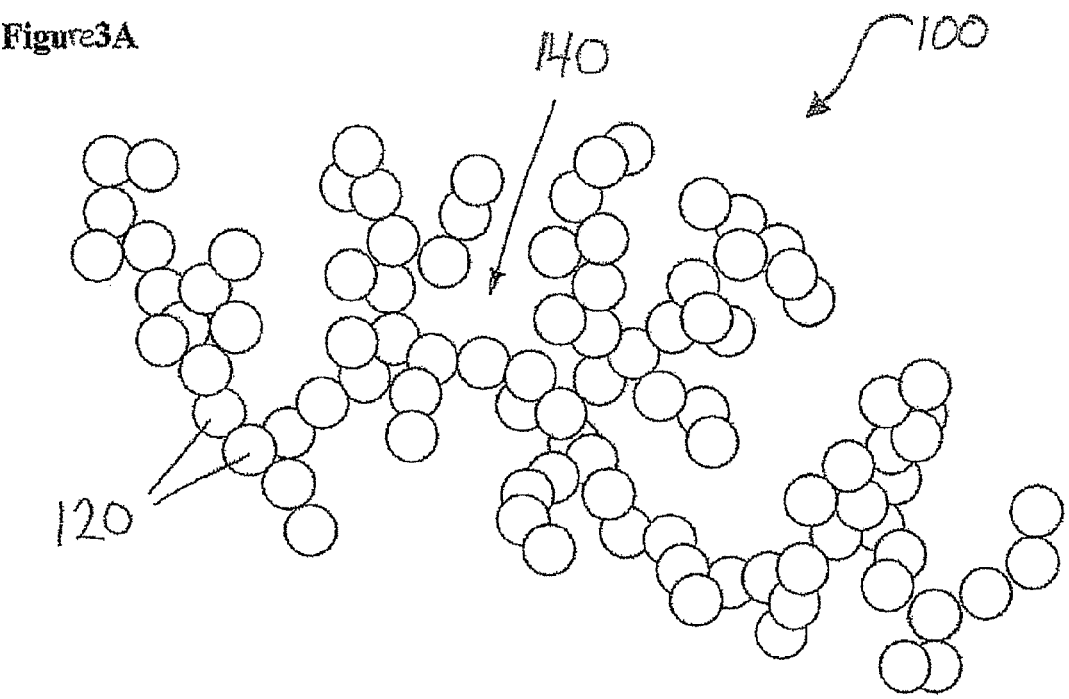
FIG. 3A is a schematic illustration of a porous cluster of silver particles.

FIG. 3A is a schematic illustration (not to scale) of a porous cluster 100 of a plurality of nanometric silver particles 120, prior to exposure to the treatment method of the present invention. The aggregation of silver particles 120 is such that a plurality of pores or porous cavities such as pore or porous cavity 140 is formed from the collective surfaces of nanometric silver particles 120.

Figure 3B:
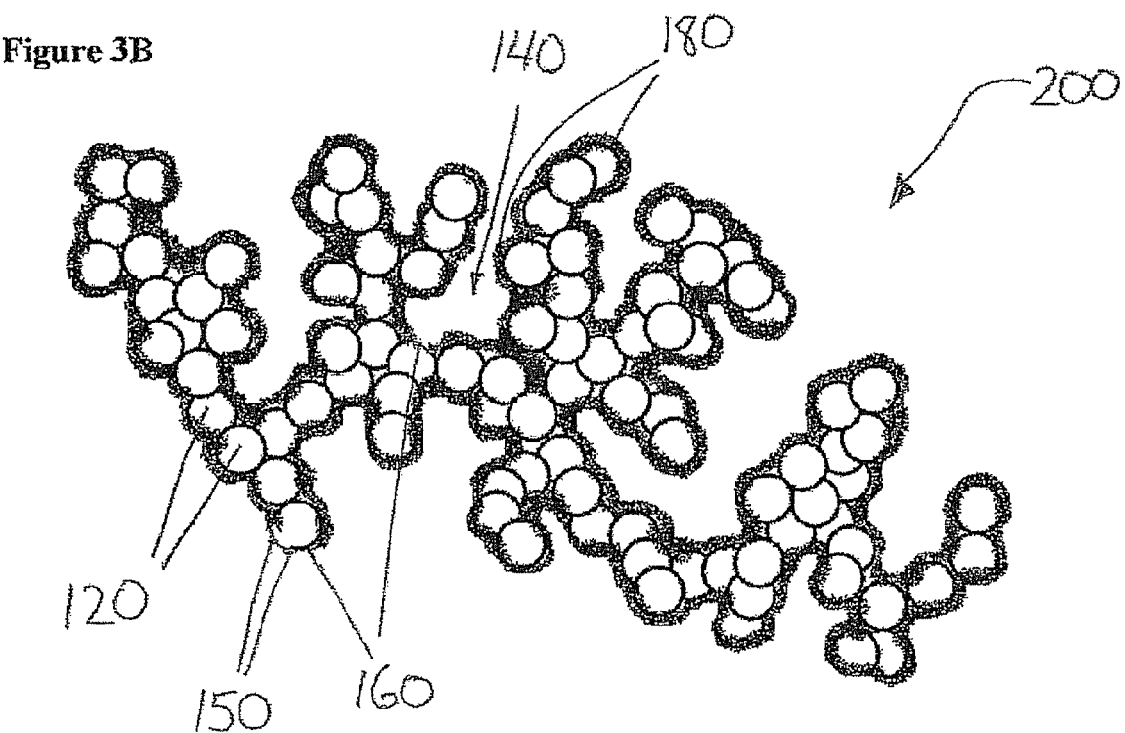
FIG. 3B is a schematic illustration of the porous cluster of silver particles of FIG. 3A, wherein a large plurality of nanometric zirconium oxide crystals are deposited on the surface made up of the silver primary particles, and in pores formed by the surfaces of the silver primary particles.

FIG. 3B is a schematic illustration (not to scale) of the porous cluster of nanometric silver particles 120 of FIG. 3A, wherein a large plurality of nanometric zirconium oxide crystals 150 are deposited on a surface 160 of nanometric silver particles 120. Zirconium oxide crystals 150 are also deposited in pores or porous cavities such as pore or porous cavity 140, which are made up of a plurality of surfaces 160 of nanometric silver particles 120. The resultant structure is a zirconium oxide covered, porous cluster of silver particles 200.

The nanometric zirconium oxide crystals 150 may be deposited in a manner so as to produce a continuous or semi-continuous nanolayer 180 on surface 160 and on the surface of pores or porous cavities such as pore or porous cavity 140.

The size of the primary silver particles is in the range of 20 to 100 nanometers, and preferably between 40 and 60 nanometers. This feature is measured according to scanning electron microscope images (FIG. 1) and also by laser diffraction particle size analysis by Coulter Counter® model SA3100 (Beckman Coulter, Inc.) particle size analysis.

The average cluster (agglomerate) size is in the range of 1 to 50 microns and preferably between 3-25 microns. This feature is measured according to scanning electron microscope images (FIG. 1) and also by laser diffraction particle size analysis by Coulter Counter® particle size analysis. Coulter Counter is a registered trademark of Beckman Coulter, Inc.

The average agglomerate porosity is in the range of 30% to 50%, and preferably between 35% to 45% as determined by the B.E.T. method known in the art.

The average pore size distribution is between 15 nanometers to 250 nanometers and preferably between 50 nanometers and 80 nanometers. In the preferred embodiment the average pore size is about 65 nanometers.

The B.E.T. specific surface area of the porous cluster is between 3 and 16 square meters per gram, and preferably between 6 and 10 square meters per gram.

The tap density in units of grams per cubic centimeter is in the range of 1 to 3 g/cc and preferably between 1.5 and 2.5 g/cc.

The purity of the silver in the catalyst is above 99% by weight, and preferably in the range of 99.6% to 99.95%.

In this invention the zirconium oxide content in the catalyst porous cluster can range between 1% to 6% by weight, and preferably between 2% to 4%.

The minimum purity of the promoted catalyst, that is silver and zirconium oxide together, should be at least 99.7% by weight.

Following is an example of a method for producing nano-size silver catalyst promoted by zirconium oxide according to the present invention:

100 g of the silver powder produced from heat treated strips of 25Ag-75Al alloy (weight percent) and having a primary particle size about 40-50 nanometers, was taken as a precursor material. The specific surface area (SSA) as measured by the B.E.T. method of this powder was 6.7 $m^2/g$. 10 g of zirconium (IV) dinitrate oxide hydrate was dissolved in 200 ml of water. Silver powder was immersed in this solution and soaked for 1 hour. Afterwards, 30 ml of 25% NaOH was poured into the suspension under intensive stirring, which lasted for a few minutes until the reaction (precipitation of white flakes) was finished. Then the mix was rinsed to a neutral pH of about 7 to remove the NaOH solution, decanted and dried out. The heat treatment was carried out according to the following mode:

250° C. for 60 minutes for dehydration, and then

450° C. for 15 minutes to produce zirconium oxide crystals.

The final $ZrO_2$ content in the catalyst is 3.8% by weight, and SSA of the catalyst is 7.5 $m^2/g$. Generally, the zirconium oxide content in the catalyst of the present invention can range between 1% to 6% by weight, and preferably between 2% to 4%. The minimum purity of the promoted catalyst, that is silver and zirconium oxide, should be at least 99.7% by weight or higher.

Application of Inventive Catalyst to Air/Oxygen Electrodes a. Manufacturing of the Electrode The air electrode, consisting of an active mix of the inventive silver catalyst, current collector and a hydrophobic porous film (such as polytetrafluoroethylene (PTFE)) bonded thereto, can be produced by compacting and sintering.

The cathode, described hereinabove with regard to FIG. 2, includes inventive active catalyst mix C, at least one current collector B, and a hydrophobic layer A. A broad face of hydrophobic layer A covers both active catalyst mix C and current collector B. It is further evident from FIG. 2 that catalyst mix C and current collector B are disposed on a single side of the broad face of hydrophobic layer A.

In practice, the catalyst mix includes the inventive porous clusters of silver particles and a water repellant material in powder or fibrous form. In particular, the water repellant polymers include but are not limited to paraffin, and hydrophobic polymers. Such hydrophobic polymers include fluorinated polymers. Such fluorinated polymers include but are not limited to polytetrafluoroethylene, fluorinated ethylene-propylene, perfluoroalkoxy polymer resin chlorotrifluoroethylenes, and polyvinylidene fluorides.

By weight, the percent of the water repellant powder in the catalyst mix should be between 5-20%, more preferably between 12-18%, and in the preferred embodiment 16%.

In practice, the inventive air cathode can use a variety of materials for the electronically conductive current collector. These include but are not limited to metal screen, metal wire mesh, non-woven metal fiber mat, perforated metal sheet, and stretched (expanded) metal foils. The metals that can be chosen for these current collector forms include nickel, nickel alloys, steel, various types of stainless steel, silver, silver coated nickel, silver coated nickel alloys, silver coated steel, silver coated stainless steel, and others that are suitable for contact with silver in alkaline electrolytes.

The material for the hydrophobic layer includes but is not limited to fluorinated polymers. Such fluorinated polymers include but are not limited to polytetrafluoroethylene, fluorinated ethylene-propylene, perfluoroalkoxy polymer resin, chlorotrifluoroethylenes, and polyvinylidene fluorides. The porosity and the thickness of the hydrophobic layer is chosen so as to optimize the performance of the inventive cathode in its electrochemical cell. Parameters to consider for the optimization include the target rate capability (current output), operating life time, and other items that one skilled in the art is familiar with. For instance a low porosity thin hydrophobic layer permits high currents (that is high rate of oxygen gas diffusion across the layer) but may allow movement of liquid from the electrolyte to the gas side of the cathode and thus drying out of the cell and flooding of the pores and thereby shortening the effective lifetime. In other versions, thin hydrophobic layers may have low porosity, and thick hydrophobic layers may have high porosity. The combined effect of the thickness and porosity can be measured and quantified by the Gurley number. A Gurley number is the time in seconds it takes for 100 cc of air to pass through one-square inch of membrane when a constant pressure of 4.88 inches of water is applied.

The active mix for the air electrode was produced by double sieving of the above-described catalyst through a 75 micron sieve and manually mixing it with PTFE powder of grade Zonyl MP 1200 produced by DuPont®. This PTFE powder has an average particle size of 3 microns. The ratio (by weight) of catalyst to FIFE powder was 84:16.

The active mix loading in the experimental electrode was 85 mg/cm$^2$. A woven stainless steel grid of 20 mesh size, having a wire diameter of 0.19 mm and coated by 5-7 microns of silver was used as a current collector and supporting member of the electrode. Alternatively, an expanded metal current collector made from nickel such as 3 Ni 5-077 obtained from Dexmet® may be used. Before compacting the grid was subjected to coining (flattening) at a pressure of 250 kg/cm$^2$. PTFE Gas Diffusion Membrane D-type, produced by W. L. Gore & Associates, Inc. was used as a hydrophobic layer.

All these components were placed into the die of a press-mold and compacted at 110 kg/cm$^2$. The sintering of the electrode was carried out in air at 340° C. for 20 minutes.

The loading of the active catalyst mix in the air cathode can range from 10 milligrams per square centimeter geometric area up to 250 milligrams per square centimeter of electrode geometric area, and preferably ranges from about 20 milligrams per square centimeter geometric area up to 120 milligrams per square centimeter.

b. Electrochemical Test of the Electrode

Polarization refers to the change in voltage of the air cathode with respect to a mercury/mercury oxide reference electrode from its rest (open circuit) value to the value reached when the indicated current density is supported by the electrode. A low polarization (change in voltage) is desired for best performance and the lower the value then the better the rate capability of the electrode.

Figure 4:
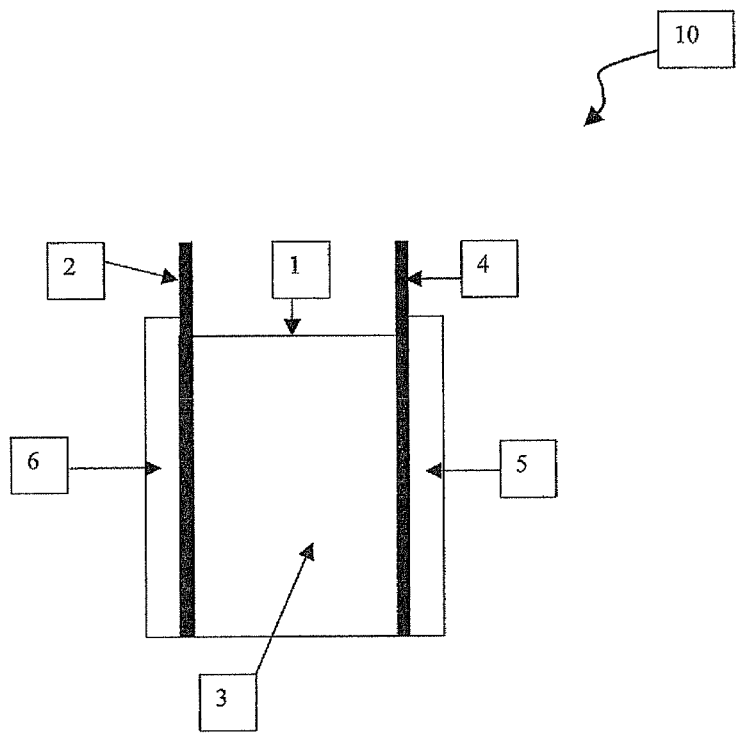
FIG. 4 is a schematic cross-sectional view of an electrochemical cell according to the present invention, in which is disposed an inventive air cathode.

FIG. 4 is a schematic cross-sectional view of an electrochemical cell 10 according to the present invention, in which is disposed an inventive air cathode 4, an anode 2, an electrolyte 3, all of which are contained within a cell casing 1.

Electrochemical cell 10 may optionally have a first passage 5 for the supply of air or oxygen to air cathode 4, and/or a second passage 6 for the supply of hydrogen or other anodic fuels to anode 2.

EXAMPLES

Reference is now made to the following examples, which together with the above descriptions, illustrate the invention in a non-limiting fashion.

Example 1

The primary electrochemical performance of the electrodes was measured in a half cell with a nickel counter electrode in 25% KOH at 24-26° C. Polarization data (with IR drop correction, that is elimination of the resistance artifact between the reference electrode and the cathode) for the experimental electrode is as follows.

| Polarization vs. current density | | | |
|---|---|---|---|
| Current density, mA/cm$^2$ | 25 | 50 | 100 |
| Polarization, mV | −21 | −64 | −110 |

Example 2

Electrochemical test of the electrode in a cycling (bifunctional) mode of operation was carried out at constant current density of 21.5 mA/cm$^2$ in the same half cell and at the same conditions used for primary electrochemical performance.

The time of each cycle: anodic (charge) and cathodic (discharge) was 35 minutes.

The electrode's polarization, mV at the end of each cycle, is as follows:

| # of cycle | End of cathodic cycle | End of anodic cycle |
|---|---|---|
| 1 | −20 | +590 |
| 2 | −21 | +598 |
| 3 | −20 | +584 |

After the 3$^{rd}$ cycle the electrode's polarization stayed unchanged for all the range of applied current densities. Taking into account the electrode's total silver content, the potentials at the end of anodic cycle correspond to the end of the silver metal conversion to AgO$_2$ oxidation process.

Thus, there is a good indication from the data that electrochemical performance of air electrodes, catalyzed by ZrO$_2$ promoted silver catalyst as per this invention will be stable at elevated temperatures, OCV conditions and in the bi-functional mode of operation for many hundreds or even thousands hours and cycles.

Example 3

Figure 5:
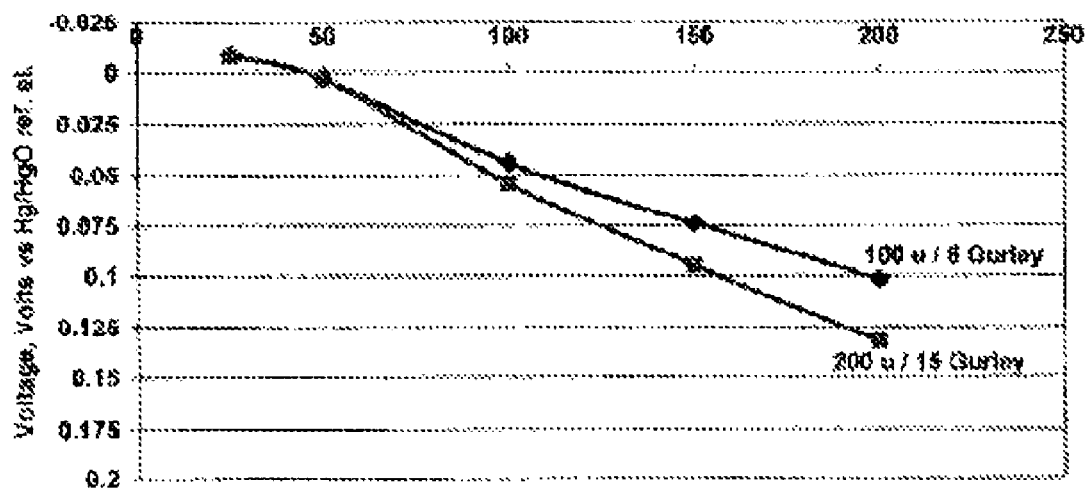
FIG. 5 depicts a carbon-less cathode behavior with different membranes using 25% KOH in air/25° C. with different Gurley numbers.

The electrode can be made with PTFE membranes with different Gurley numbers and different thickness hydrophobic layers in order to optimize performance. A Gurley number is the time in seconds it takes for 100 cc of air to pass through one-square inch of membrane when a constant pressure of 4.88 inches of water is applied. FIG. 5 depicts a carbon-less cathode behavior with different membranes using 25% KOH in air/25° C.

Example 4

Figure 6:
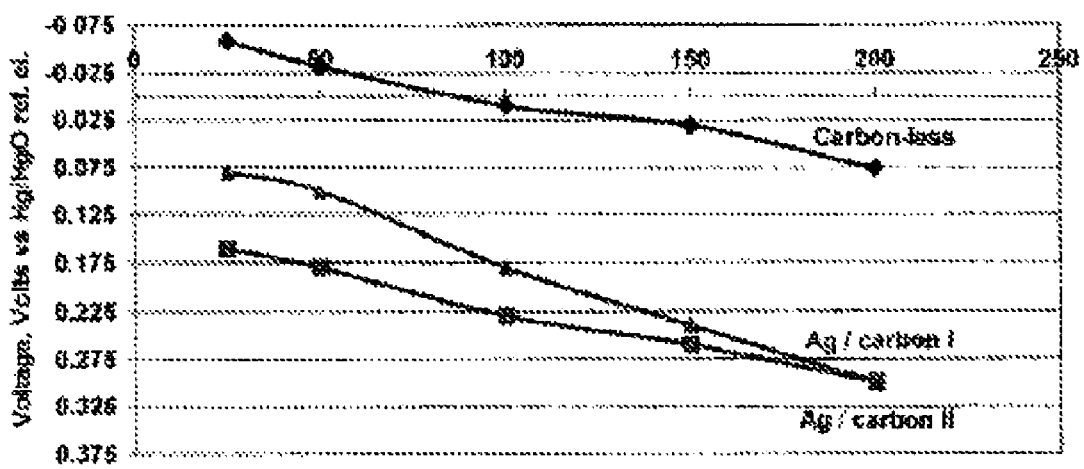
FIG. 6 is a graph demonstrating the performance of silver catalyst air cathodes: carbon-less vs. commercial carbon products in 25% KOH in air at 60° C.

It is evident from the plots of voltage vs. current density provided in FIG. 6, that the inventive electrode performs significantly better than a conventional air electrode with silver catalyst supported on carbon powder.

Example 5

Figure 7:
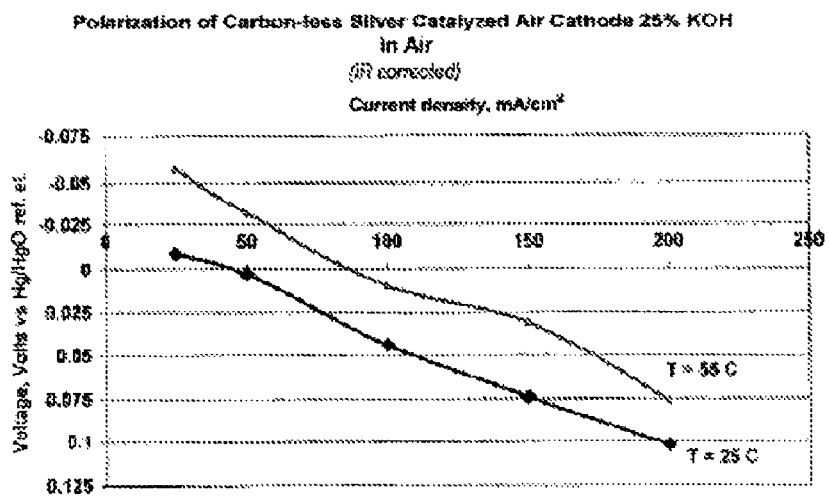
FIG. 7 is a graph demonstration the polarization of carbon-less silver catalysed air cathode using 25% KOH in air at room temperature and at elevated temperature.

The inventive electrode has a broad operating temperature range, operating well at low temperatures down to near the freezing point of the alkaline electrolyte up to near the boiling point of the alkaline electrolyte. FIG. 7 shows performance at room temperature and elevated temperature.

Example 6

The inventive electrode can work with a broad range of active catalyst mix loadings, with preferred loadings of 5 mg/cm² of electrode geometric area up to 500 mg/cm².

Figure 8A:
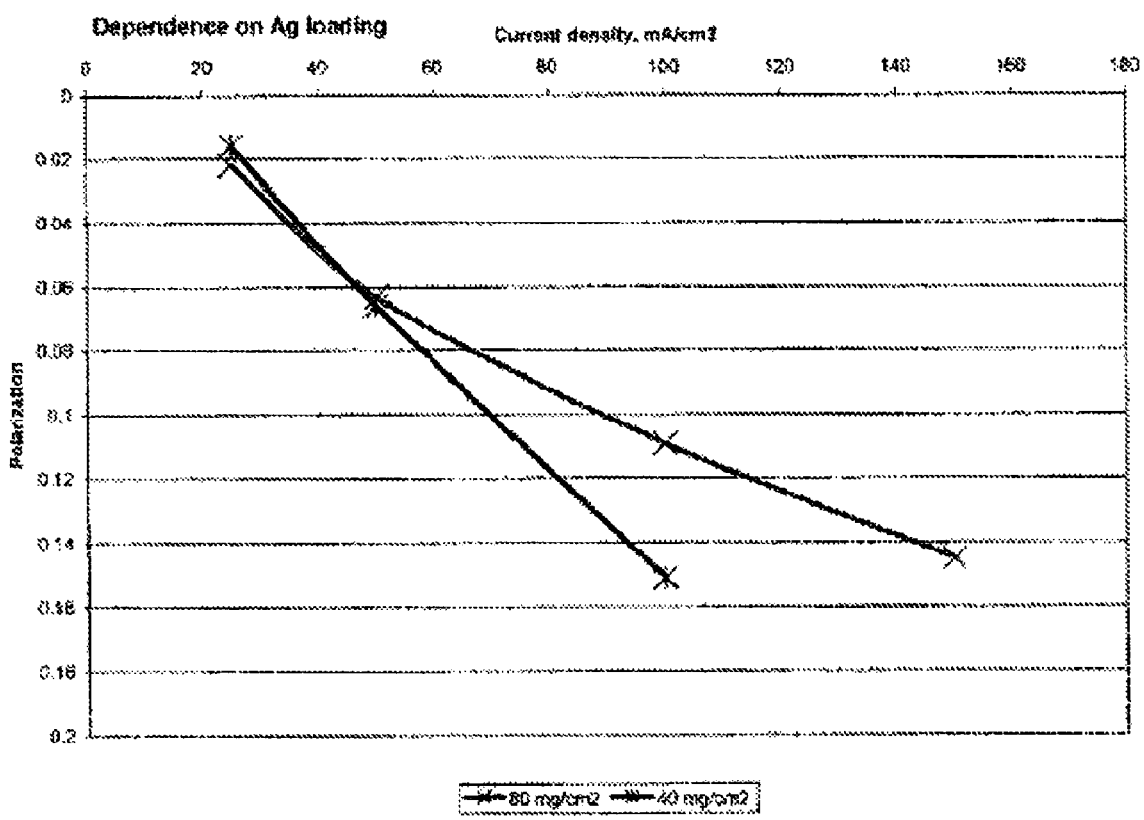
FIG. 8A and FIG. 8B depicts performance of electrodes with a range of active catalyst mix loading of 80 mg/cm$^2$ vs. 40 mg/cm$^2$ (FIG. 8A); and 60 mg/cm$^2$ vs, 100 mg/cm$^2$ (FIG. 8B).
Figure 8B:
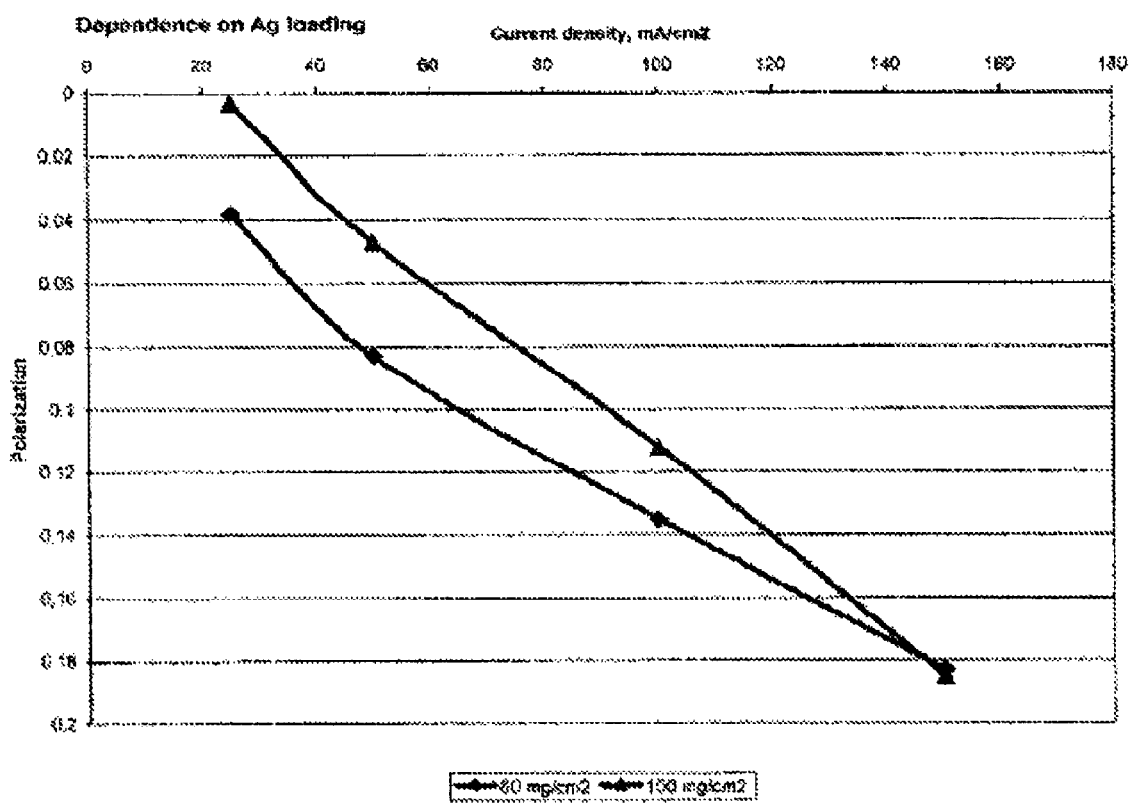

FIGS. 8A and 8B show performance for electrodes with a range of active catalyst mix loadings.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification, are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A catalyst comprising:
   a plurality of porous clusters of silver particles, each cluster of said clusters including a plurality of primary particles of silver and crystalline particles of zirconium oxide ($ZrO_2$), wherein at least a portion of said crystalline particles of $ZrO_2$ is located in pores formed by a surface of said plurality of primary particles.

2. The catalyst of claim 1, wherein said primary particles have an average size up to 100 nanometers, the pores in said porous clusters have an average characteristic diameter of 15 to 80 nanometers and the crystalline particles of $ZrO_2$ have an average particle size of less than about 20 nanometer.

3. The catalyst of claim 1 further comprising a water-repellant polymer.

4. The catalyst of claim 3, wherein said water-repellant polymer is selected from the group of water-repellant polymers consisting of paraffins and hydrophobic polymers.

5. The catalyst of claim 4 wherein said hydrophobic polymers fluorinated polymers.

6. The catalyst of claim 5 wherein said fluorinated polymers comprise one or more of the group consisting polytrifluoroethylene, fluorinated ethylene-propylene, a perfluoroalkoxy polymer resin chlorotrifluoroethylene, and a plyvinylidene fluoride.

7. A method of producing a catalyst of claim 1 comprising:
   providing a silver powder containing porous clusters of silver particles;
   impregnating said clusters of silver particles by contacting said particles with an aqueous solution containing a zirconium (IV) compound selected from the group consisting of zirconium (IV) dinitrate oxide hydrate and zirconium (IV) dichloride oxide hydrate, so as to form a suspension;
   contacting said suspension with an aqueous alkaline solution to produce zirconium hydroxide, which precipitates in pores of said porous clusters;
   rinsing and drying the clusters with said zirconium hydroxide precipitated in said pores to produce a dried residual material; and
   heating said residual material to effect dehydration and subsequently heating to produce crystals of zirconium oxide, thereby forming a silver catalyst promoted by zirconium oxide.

8. The method of claim 7, wherein said rinsing is performed so as to bring said solutions to a pH in a range of 6 to 8.

9. The method of claim 7, wherein said alkaline solution includes a metal hydroxide selected from the group consisting of potassium hydroxide and sodium hydroxide.

* * * * *